(12) United States Patent
Salle et al.

(10) Patent No.: US 9,209,139 B2
(45) Date of Patent: Dec. 8, 2015

(54) MULTILAYER SECURITY WRAP

(71) Applicant: Johnson Electric S.A., Murten (CH)

(72) Inventors: Vincent Daniel Jean Salle, Cowes (GB);
Dominic John Ward, Carisbrooke (GB);
Martin Wallace Edmonds, East Cowes (GB); Libing Zhang, Sharon, MA (US)

(73) Assignee: JOHNSON ELECTRIC S.A., Murten (CH)

( * ) Notice: Subject to any disclaimer, the term of this patent is extended or adjusted under 35 U.S.C. 154(b) by 199 days.

(21) Appl. No.: 13/952,350

(22) Filed: Jul. 26, 2013

(65) Prior Publication Data

US 2014/0033331 A1 Jan. 30, 2014

(30) Foreign Application Priority Data

Jul. 27, 2012 (GB) .................................. 1213447.4

(51) Int. Cl.

| H01L 23/28 | (2006.01) |
|---|---|
| H01L 23/00 | (2006.01) |
| G08B 13/24 | (2006.01) |
| G06F 21/87 | (2013.01) |

(52) U.S. Cl.
CPC ............... *H01L 23/57* (2013.01); *G06F 21/87* (2013.01); *G08B 13/242* (2013.01); *G08B 13/2437* (2013.01); *H01L 23/573* (2013.01); *H01L 23/576* (2013.01)

(58) Field of Classification Search
CPC .............................. G08B 13/242; H01L 23/57
See application file for complete search history.

(56) References Cited

U.S. PATENT DOCUMENTS

| 5,103,210 A * | 4/1992 | Rode et al. ................. 340/572.3 |
| 5,276,431 A * | 1/1994 | Piccoli et al. .............. 340/572.5 |
| 5,574,431 A * | 11/1996 | McKeown et al. ......... 340/572.3 |
| 5,841,350 A * | 11/1998 | Appalucci et al. ......... 340/572.3 |
| 2002/0084090 A1 | 7/2002 | Farquhar et al. |
| 2004/0212017 A1 | 10/2004 | Mizuno et al. |
| 2006/0259788 A1 | 11/2006 | Elbert et al. |
| 2008/0278353 A1 | 11/2008 | Smith et al. |

FOREIGN PATENT DOCUMENTS

| EP | 1742184 | 1/2007 |
| JP | 10133582 | 5/1998 |
| JP | 2002049317 | 2/2002 |
| WO | WO 99/21142 EP | 4/1999 |

OTHER PUBLICATIONS

GB Search Report, Date of search Nov. 16, 2012.

* cited by examiner

*Primary Examiner* — Van Trieu
(74) *Attorney, Agent, or Firm* — Muncy, Geissler, Olds & Lowe, P.C.

(57) ABSTRACT

A security wrap (20) for protecting an electronic component (16) having a bonding surface includes a substrate (22) having a first side and a second side opposite to each other. A first security screen (26) is disposed over the first side of the substrate (22) and includes a first pair of screen terminals (48) and a first conductive track (46) between the first pair of screen terminals (48). A second security screen (26) includes a second pair of screen terminals (48) and a second conductive track (46) between the second pair of screen terminals (48) and overlaying the first conductive track (46) on the first security screen (26). A layer of adhesive (30) is over a side of the second security screen (26) remote from the substrate (22) and bonds the second security screen (22) to the bonding surface of the electronic component (16).

20 Claims, 9 Drawing Sheets

MULTILAYER SECURITY WRAP

CROSS REFERENCE TO RELATED APPLICATIONS

This non-provisional patent application claims priority under 35 U.S.C. §119(a) from Patent Application No. 1213447.4 filed in United Kingdom on Jul. 27, 2012.

FIELD OF THE INVENTION

This invention relates to a tamper indication device and in particular to a security wrap for an electronic circuit to protect against tampering.

Although this invention will be described in relation to security wraps as an example of the invention, the invention can be used with any printed electronics (PE) flex requiring a need for detection of removal or tampering.

BACKGROUND OF THE INVENTION

Security wraps form a solid security screen masking an area of the electronics to be protected. Removal of security wrap is physically difficult due to the manner in which the security wrap is attached to the device, usually by gluing, soldering or encapsulation with a resin material. However, they offer little in tamper resistance or indication of tampering except by visual inspection. Some systems have an alarm circuit which may disable the device or simply give a visual indication that the security wrap has been removed, but there is no detection of an attempt to remove or bypass the security wrap by drilling a hole through it or simply lifting up a corner of the wrap.

In addition, coating with resins or encapsulating the security wrap creates a heavier and thicker construction whilst industry is striving to develop thinner and lighter devices to maximize internal space for more components to add greater functionality into portable electronic devices such as point of sale (POS) terminals and other applications and/or to make the devices smaller and lighter.

Further, for some devices, such as credit card readers, there is a need to operate pre-assembled components of the device, for example curved metal discs known as metal domes for keypad buttons and so it is not feasible to encapsulate or coat the security wrap with resins. Resins create a hard shell that prevents the mechanical operation or tactile feedback of such components. The resin typically forms a permanent coating such that repair of the PCB or components is no longer possible.

SUMMARY OF THE INVENTION

In one aspect thereof, the present invention provides a security wrap for protecting an electronic component having a bonding surface, comprising: a substrate having a first side and a second side opposite to each other; a first security screen disposed over the first side of said substrate and including a first pair of screen terminals and a first conductive track between the first pair of screen terminals; a second security screen including a second pair of screen terminals and a second conductive track between the second pair of screen terminals and overlaying the first conductive track on said first security screen; and a layer of adhesive over a side of said second security screen remote from said substrate and bonding said second security screen to the bonding surface of the electronic component.

Preferably, said second security screen is disposed over the second side of said substrate.

Preferably, further comprising a dielectric layer over a side of said first security screen remote from said substrate, wherein said second security screen is disposed over said dielectric layer.

Preferably, further comprising an adhesion modification layer having intermittent pattern formed between the first side of said substrate and said first security screen, wherein said first security screen has a bonding strength to said substrate in the intermittent pattern of said adhesion modification layer different than a bonding strength between said first security screen and said substrate outside the intermittent pattern of said adhesion modification layer.

Preferably, the electronic component includes an alarm circuit having a plurality of terminals; and the first pair of screen terminals on said first security screen is coupled to two of the plurality of terminals of the alarm circuit of the electronic component.

Preferably, the second pair of screen terminals of said second security screen is coupled to another two of the plurality of terminals of the alarm circuit of the electronic component.

Preferably, second conductive track between the second pair of screen terminals of said second security screen is connected in series with the first conductive track between the first pair of screen terminals of said first security screen between the two of the plurality of terminals of the alarm circuit of the electronic component.

Preferably, further comprising a conductive via connecting a terminal in the first pair of screen terminals on said first security screen to a terminal in the second pair of screen terminals on said second security screen.

Preferably, the alarm circuit of the electronic component is sensitive to a variation in a resistance between the two of the plurality of terminals; and the second conductive track between the second pair of screen terminals of said second security screen is connected in parallel with the first conductive track between the first pair of screen terminals of said first security screen between the two of the plurality of terminals of the alarm circuit of the electronic component.

Preferably, the electronic component further includes a conductive pad formed on the bonding surface and coupled to one of the two terminals of the plurality of terminals; and said layer of adhesive includes a conductive plug formed therein and connecting one of the second pair of screen terminals on said second security screen to the conductive pad on the bonding surface of the electronic component.

Preferably, the electronic component further includes a conductive dome formed on the bonding surface and coupled to one of the two terminals of the plurality of terminals; said second security screen further includes a conductive extension connected to one of the second pair of the screen terminal and over the conductive dome in the bonding surface of the electronic component; said layer of adhesive has a void surrounding the conductive dome on the bonding surface of the electronic component and the conductive extension on said second security screen; and the conductive extension of said second security screen is configured to contact the conductive dome on the bonding surface of the electronic component in response to a force applied on the said substrate over the conductive extension.

Preferably, said first security screen further includes an additional pair of screen terminals and an additional conductive track between the additional pair of screen terminals.

Preferably, the first conductive track on said first security screen is formed from a conductive ink in a printing process.

Preferably, the first conductive track on said first security screen has a first pattern: and the second conductive track on said second security screen has a second pattern different from the first pattern.

In another aspect thereof, the present invention provides a security wrap for protecting a device having an alarm circuit by bonding to the device, comprising: a substrate having a first side and a second side opposite to each other; a first security screen disposed over the first side of said substrate and including a first conductive track coupled to the alarm circuit of the device; a second security screen including a second conductive track overlaying the first conductive track on said first security screen and coupled to the alarm circuit of the device; and a layer of adhesive over the a side of said second security screen remote from said substrate and bonding the said second security screen to the device.

Preferably, said second security screen is disposed over the second side of said substrate.

Preferably, further comprising a dielectric layer over a side of said first security screen remote from said substrate, wherein said second security screen is disposed over said dielectric layer.

Preferably, the first conductive track on said first security screen has a first pattern: and the second conductive track on said second security screen has a second pattern different from the first pattern.

Preferably, the first conductive track on said first security screen and the second conductive track on said second security screen are connected in series between two terminals of the alarm circuit of the device.

Preferably, said first security screen further includes an additional conductive track between the additional pair of screen terminals coupled to the alarm circuit of the device.

By overlaying screens composed of conductors arranged according to different predetermined patterns, the gaps between the circuitry of the security wrap can be significantly reduced or even eliminated, depending on the number of screens used.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
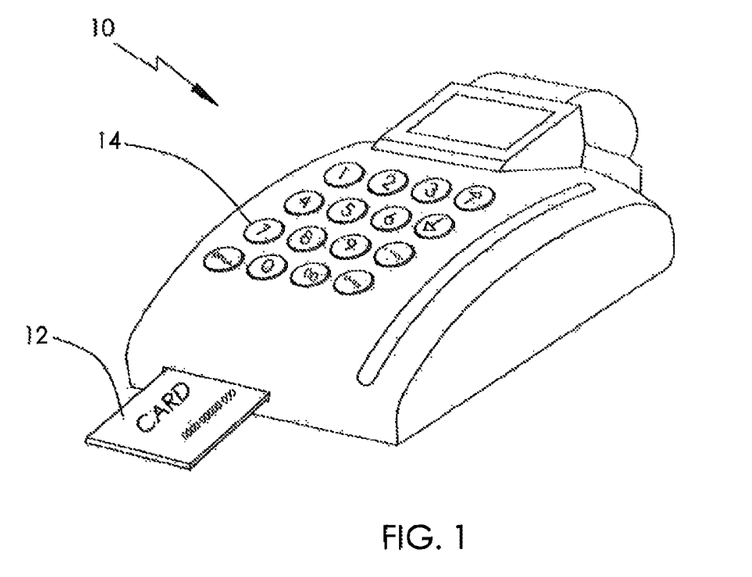
FIG. 1 illustrates a point of sale (POS) device as an example of a device which uses a security wrap in accordance with the present invention.

FIG. 1 illustrates an electronic device, by way of example, in the form of a point of sale (POS) device 10. The POS device 10 is arranged to read details from a card 12, such as a credit card and has a key pad 14 for entering information and giving instructions to the POS device 10. A security wrap is used to protect the data stored in the memory of the POS device 10, generally some form of a memory chip. If unprotected, a perpetrator may access the contents of the memory in the POS device 10.

Figure 2:
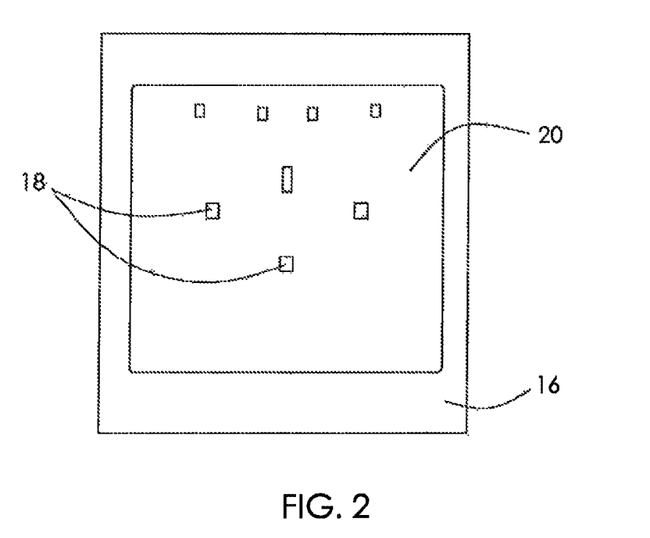
FIG. 2 illustrates the security wrap fitted to a PCB of the device of FIG. 1.

A PCB 16 of device 10 is shown in FIG. 2 with the a security wrap 20 fitted thereon. Security wrap 20 appears as a flexible sheet overlaying PCB 16. In accordance with a preferred embodiment of the present invention, a substrate of the security wrap 20 is opaque so as to hide the layout or pattern of a screen (not shown in FIG. 2) and the underlying circuitry on PCB 16. Holes 18 in security wrap 20 and PCB 16 facilitate the mounting of the PCB 16 to a housing of device 10.

Figure 3:
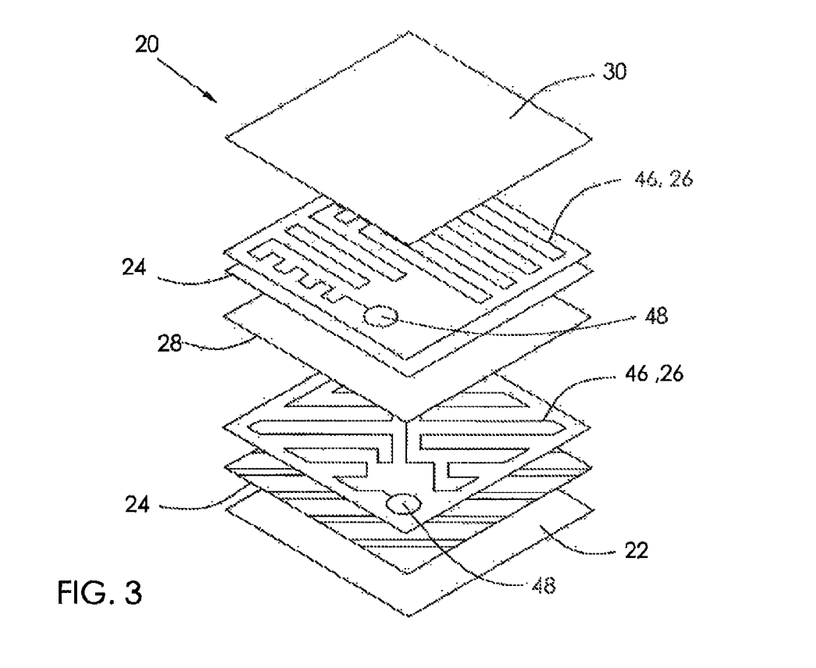
FIG. 3 is an exploded view of a security wrap in accordance with an embodiment of the present invention.
Figure 4:
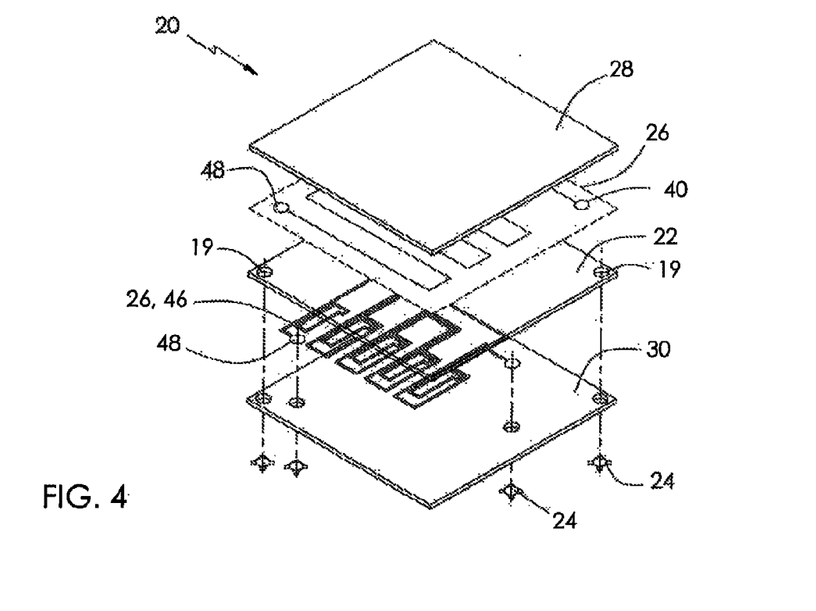
FIG. 4 is an exploded view of a security wrap according to another embodiment.

By way of example, FIG. 3 is an exploded view of a two layer security wrap 20, meaning a security wrap with two screens, having breakable conductors (also referred to as conductive track). FIG. 4 is an exploded view of a similar two layer security wrap 20. The security wrap has a substrate 22, a first screen 26 bonded to the substrate 22 and composed of a first conductor 46 having ends forming a pair of first screen terminals 48, and a dielectric layer 28 formed on the first screen 26. In the embodiment of FIG. 3, a second screen 26 is bonded to the dielectric layer 28 and composed of a second conductor 46 having ends forming a pair of second screen terminals 48, and a layer of adhesive 30 is disposed on the second screen 26 for bonding the security wrap 20 to a parent device 16 such as a PCB, housing or similar. In the embodiment of FIG. 4, a second screen 26 is bonded to the other surface of the substrate 22 and composed of a second conductor 46 having ends forming a pair of second screen terminals 48. A layer of adhesive 30 is disposed on the second screen 26 for bonding the security wrap 20 to a parent device 16 such as a PCB, housing or similar.

For a multi-layer security wrap with breakable conductors, an intermittent layer of adhesive modifier 24 is applied between the substrate 22 and the first screen 26 and between the dielectric layers 28 and the subsequent screens 26. It should be noted that the use of breakable conductors is optional and that breakable conductors can be formed using different method not involving a release layer. Hence no release layer is shown in FIG. 4.

The general principles of construction are common for each embodiment. The security wraps 20 have a substrate 22, at least two screens 26, and a layer of adhesive 30 to bond the security wrap 20 to the parent device 16. Dielectric layers 28 may be used to provide insulation between adjacent conductive layers 26. The order and number of the layers may change depending on the application and security level required. As mentioned about, optional release layers 24 may be used.

The substrate 22 is preferably a polymer film, typically a polyethylene terephthalate (PET or commonly referred to as polyester) film, that provides a base for a security wrap 20 circuit. Optionally the substrate 22 is flexible, being a film of thickness between 25 µm and 175 µm but can be greater depending on functional requirements and may include other variants of polymer film including, but not limited to, polycarbonate, PEN, polyimide and PVC. The substrate 22 may be clear but preferably is opaque and pigmented, for example black or white.

The screens 26 are composed of a pattern of one or more conductive traces or conductors 46 preferably formed by thermoset or thermoplastic conductive ink printed over the substrate 22 in variable trace widths and serpentine mesh patterns forming an electrically conductive path between a pair of screen terminals 48. Preferably, the screen terminals 48 are simply the ends of the conductors 46. A single screen 26 may have one, two or more conductors interconnecting respective pairs of screen terminals 48, as graphically shown in FIG. 17.

The conductive inks can be silver, silver-coated copper or gold containing conductive or resistive ink, each with specific properties that suit the necessary requirement for the operation and functionality of the security wrap 20 flexible circuit. Multiple layers 26 can be printed in total isolation or connected at specific points depending on the intended functionality of the security wrap 20 flexible circuit. The conductive ink can also be carbon, graphite, clear conductive polymer or other conductive or resistive ink, each with specific properties that suit the necessary requirement for the operation and functionality of the security wrap circuit.

The dielectric layer 28 is preferably, a UV curable ink system with electrically insulative properties and is used as a separating medium to permit multiple layers 26 of conductive ink or screens to be printed on a single substrate 22. For example, the dielectric layer 28 may be applied directly over the first screen 26 by a printing process to insulate the first security screen 26 from the second screen 26 or from other conductive circuit components, either of the security wrap 20 or the parent device 16.

Depending on security wrap 20 functionality, the dielectric layer 28 can be printed partially or fully over the top of a conductive trace pattern of a screen to enable a subsequent screen to be printed but remain electrically isolated from the first where necessary. A number of screen/dielectric layers can be printed in succession.

The adhesive layer 30 is preferably a pressure-sensitive adhesive (PSA), typically an acrylic adhesive that forms a bond between surfaces when pressure is applied. The adhesive may be applied as an adhesive ink or as a laminate. The adhesive layer 30 is used to bond the security wrap 20 to the parent device 16. Alternatively, the adhesive maybe a liquid adhesive such as an epoxy, or moisture-cure urethane etc. which is dispensed or printed between the security wrap 20 and the PCB 16, which is then cured by moisture, thermal or UV energy and forms a permanent bond between wrap and PCB. This type of adhesive is not pressure sensitive, but could work under the same disclosed principle.

Depending on the material of the parent device 16 to which the security wrap 20 is adhered a variant PSA with specific adhesion properties could be used. Specifically the adhesion to the parent device 16 must be stronger than the adhesion to the substrate 22, so that on separation of the security wrap 20 from the parent device 16, the adhesive layer 30 will remain adhered to the parent device 16 in order to break the conductive tracks 46 of the screens 26.

The release layer 24 is preferably, an ultra-violet (UV), infra-red (IR) or thermally cured ink system used to provide a different adhesion level between the substrate 22 and the security screen 26. The ink is thus an adhesion modifier. The release layer 24 is intermittent and applied to the substrate in a predetermined pattern by a printing process and is not a complete layer such that there are areas of substrate 22 which are not covered by the adhesion modifier ink. Optionally, the pattern of the release layer 24 is simple stripes or dots.

Figure 5A:
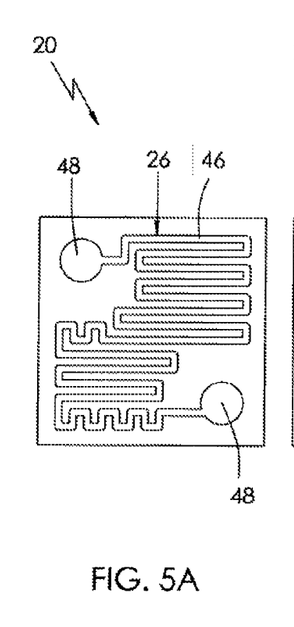
FIG. 5A-C are schematic representations of three screens have different conductor patterns in accordance with the present invention.
Figure 5B:
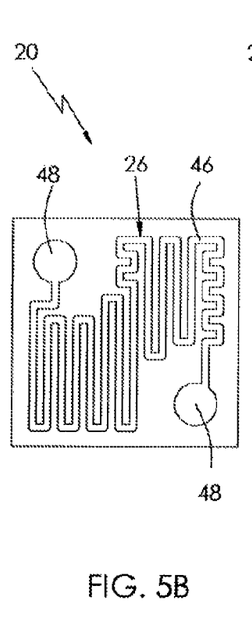
Figure 5C:
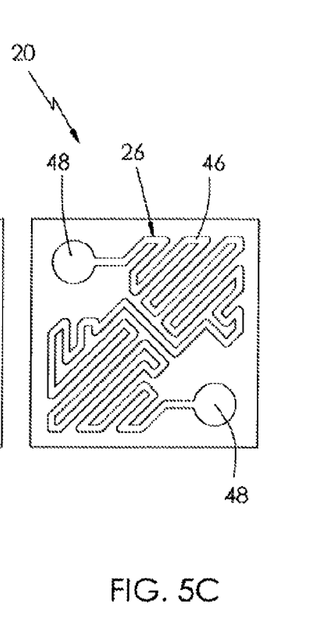

By way of example, FIGS. 5A-C illustrate three possible patterns of conductors 46 for use as screen 26. FIG. 5A, illustrates a first pattern, in which screen 26 is formed by one conductor 46 that terminates at two screen terminals 48. The screen terminals 48 may be simply the ends of the conductor 46. Additional screen terminals 48 may be formed between the ends of the conductor 46, depending on the requirements of the alarm circuit. Likewise, FIG. 5B illustrates a second pattern, in which the screen 26 is formed by one conductor 46 that terminates at two screen terminals 48. The pattern shown in FIG. 5B is formed by flipping the first pattern shown in FIG. 5A about a diagonal passing through the two terminals. FIG. 5C illustrates a third pattern, in which the screen 26 is formed by one conductor 46, terminating at a pair of screen terminals 48. The third pattern is different from the other two patterns. In accordance with an embodiment of the present invention, screen terminals 48 may function as contact pads. Each of the screens 26 should have a conductor pattern which is different from the pattern of the other screens used in the security wrap.

Ideally, the conductor patterns are designed to form a conductor that is as thin as reliably possible and arranged so that portions of the conductor are spaced apart by a minimum spacing that is reliably reproducible and reliably separated so as not to short out sections of the conductor 46. The conductor pattern need not completely fill the wrap 20. Indeed, the wrap 20 may be used to visually obscure or hide other parts of the PCB 16 with the conductor only being used to protect a small portion of the PCB 16, such as the portion supporting the memory chip or microprocessor.

Figure 6:
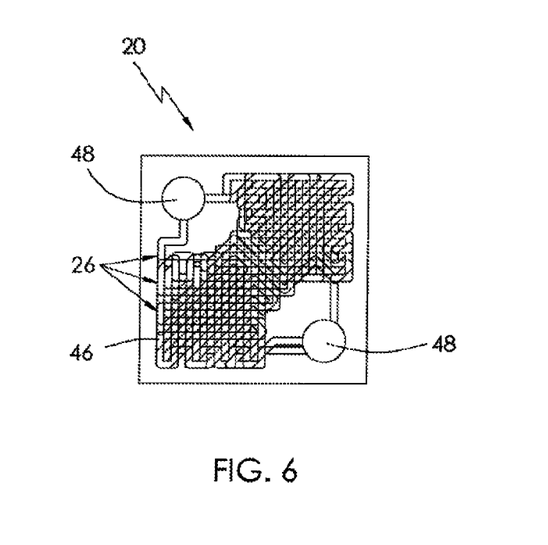
FIG. 6 is a schematic view showing the three screens of FIG. 5 overlaid to form a three layer security screen.

FIG. 6 illustrates a multi-layer security wrap 20. In this embodiment, all three screens of FIG. 5 are overlaid to form a three layer security wrap 20. As shown in FIG. 6, the spaces between adjacent potions of the conductors 46 in one layer overlap portions of the conductors 46 of the other layers, thus significantly increasing the difficulty to find a clear path through the security wrap 20. In the simple embodiment shown in FIG. 6, each screen 26 has two screen terminals 48 interconnected by a single conductor 46. Depending on the alarm circuit, the screens may be connected to respective alarm terminals, connected in series to a single alarm circuit, or connected in parallel to a single alarm circuit. For the parallel connection, in one specific embodiment, the screens have a predetermined, definite resistance and the alarm circuit is able to monitor changes in the resistance of the connection across the alarm terminals indicating tampering of the security wrap 20. The three screens 26 each have a conductor pattern 46 chosen from a predetermined set of patterns and each of the conductor patterns of the security screens of any security wrap are different.

Breaking any one of the three conductors 46 would change the current signal in the corresponding pair of terminals 48. Overlaying multiple screens having conductors 46 with patterns not coinciding with each other significantly increases the circuitry density of security wrap 20 beyond what is otherwise achievable by a single screen.

A screen with a denser pattern of conductor provides a higher security level because it would be more difficult to penetrate screen 26 without breaking conductor 46. Therefore, it is preferable to have a thin conductor 46 spreading densely throughout the area of the screen. It is also preferable for conductor 46 to be made of an easily breakable material or so arranged that the conductor is readily broken should someone attempt to remove the security wrap 20, to further increase the sensitivity of screen 26.

Figure 7:
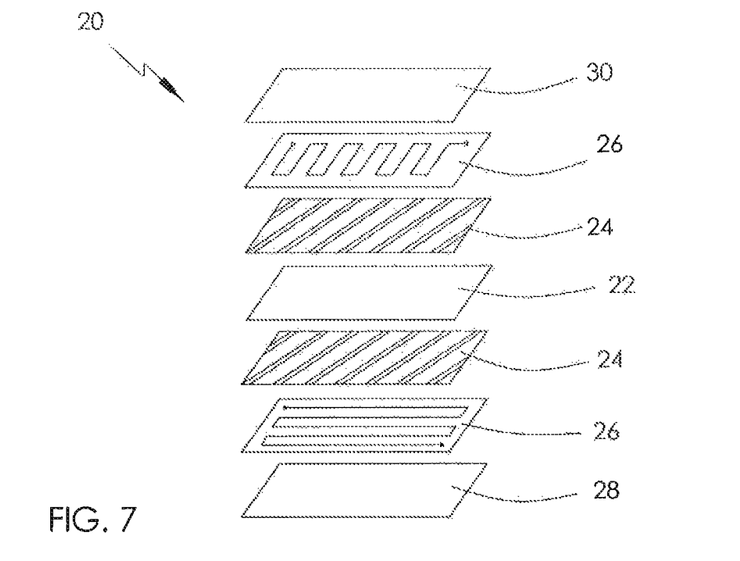
FIG. 7 is an exploded view of a two layer security wrap.

FIG. 7 illustrates a multilayer security wrap 20 having two screens 26 both of which are printed on to the substrate 22, over a release layer 24 such that the substrate 22 has a screen on both surfaces. The outer screen 26 is covered by a dielectric layer 28 and the inner screen 26 is covered by the adhesive layer 30.

Figure 8:
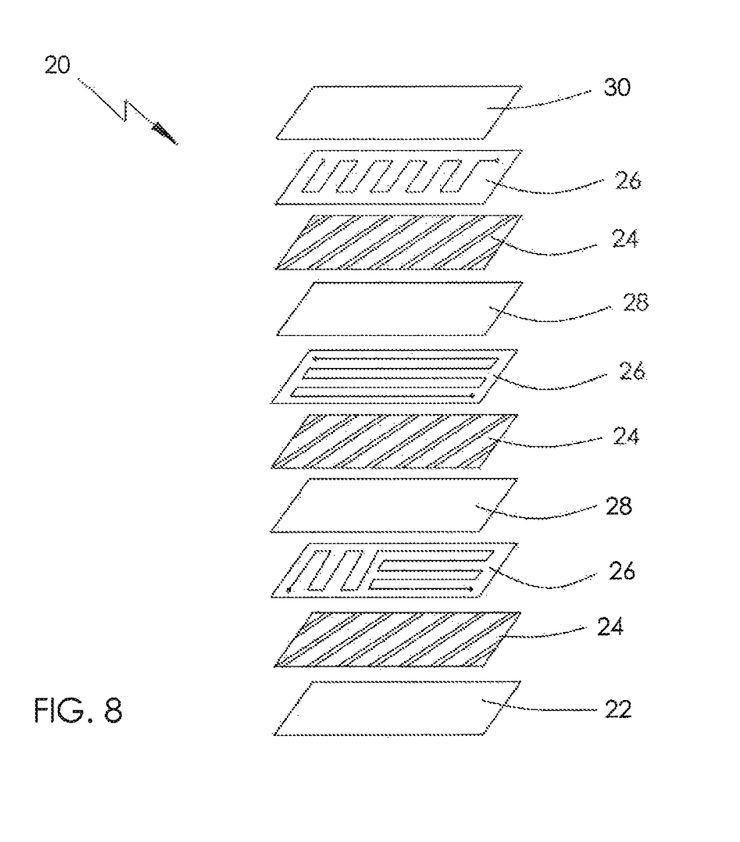
FIG. 8 is an exploded view of a three layer security wrap.

FIG. 8 illustrates a multilayer security wrap 20 having three screens 26. First screen 26 is printed on to the substrate 22 over an intermittent release layer 24. A first dielectric layer 28 is printed over the first screen 26. A second release layer 24 is printed on the dielectric layer 28 and a second screen 26 is printed on the first dielectric layer 28 over the second release layer 24. A second dielectric layer 28 is printed over the second screen 26 and a third release layer 24 is formed on the second dielectric layer 28 and a third screen 26 is printed on the second dielectric layer 28 over the third release layer 24. In this manner a security wrap 20 with any number of screens 26 can be formed. An adhesive layer 30 is applied to the last screen (in this example the third screen) 26 to bond the security wrap 20 to the parent device 16.

Figure 9:
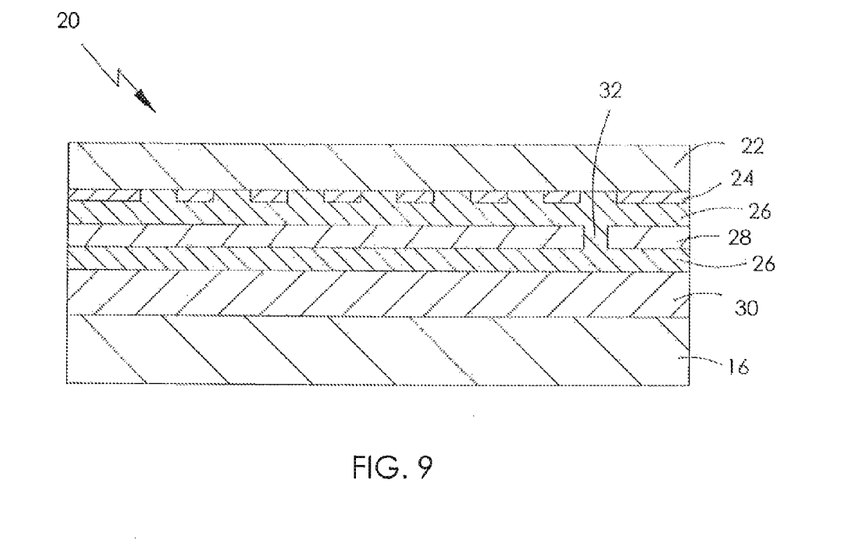
FIG. 9 is a sectional view of a two screen, single circuit security wrap, assembled to a parent device.

FIG. 9 is a sectional view showing main components in a double screen, single circuit construction of a security wrap 20 assembled to parent device 16. The security wrap 20 has a substrate 22, a release layer 24, a first screen 26, a dielectric layer 28, a second screen 26 and a layer of adhesive 30 bonding the security wrap 20 to the parent device 16. The conductive traces of the first and second screens 26 are electrically interconnected by a hole 32 in the dielectric layer 28 which is filled with conductive ink during the printing of the second screen. Such holes are known as a via. In this case it is a printed via as the connection is made using a printing process. Plated vias are also known.

Figure 10:
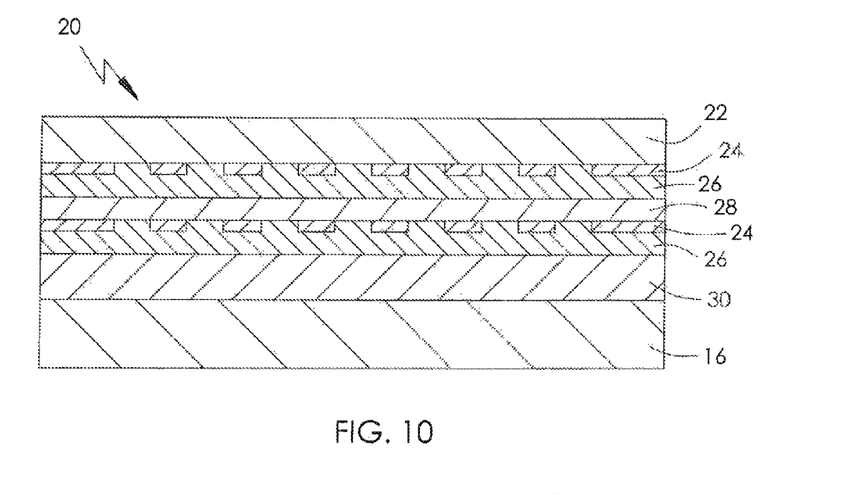
FIG. 10 is a sectional view of a two screen, double circuit security wrap, assembled to a parent device.

FIG. 10 is a sectional view showing main components in a double screen, double circuit construction of either an open or full face security wrap 20 when assembled to parent device 16. The security wrap 20 has a substrate 22, a release layer 24, a first screen 26, a dielectric layer 28, a second release layer 24, a second screen 26 and a layer of adhesive 30 bonding the security wrap to the parent device 16. The conductive traces of the first and second screens 26 are electrically isolated by the dielectric layer 28. Suitable means for connecting the first screen 26 to the alarm circuit of the parent device 16 are provided which pass through the second screen without being electrically connected.

Figure 11:
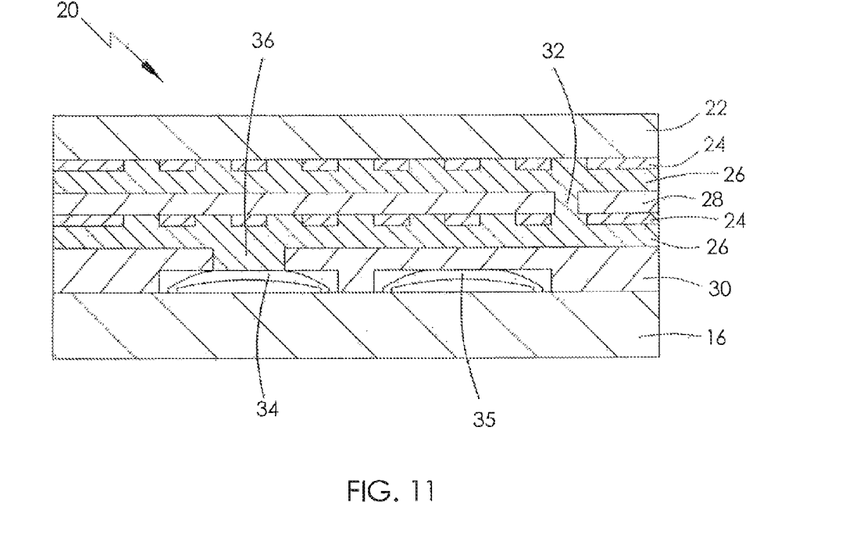
FIG. 11 is a sectional view of a two screen security wrap having a metal tactile dome.

FIG. 11 is a sectional view showing main components in a double screen construction of a single surface security wrap 20 utilizing a metal dome 34, as a conductive element to connect security wrap 20 traces to a device 16 and where the parent surface is for example a rigid or flexible PCB. This drawing illustrates the addition of metal domes 34, 35 to the security wrap of FIG. 9. A similar arrangement can be made for the double screen, double circuit construction of the security wrap of FIG. 10 by deletion of the vias 32 interconnecting the conductive layers 26 and providing isolated through connections for the screen terminals 48. The second screen 26 is formed with an extension 36 which forms a screen terminal 48. The adhesive layer 30 does not cover the extension and a void is formed below the extension to accommodate a curved metal disc known as a dome 34. The dome 34 connects the screen terminal 48 to the parent device 16, in particular, to an alarm terminal. A further void is shown accommodating a second dome 35 which is insulated for the conductive layer 26 by the adhesive layer 30. Dome 35 is an example of how the security wrap 20 can be applied over switches. Dome 35 is an ancillary conductive element used to close a two pole switch on the surface of the parent device 16 which is operated by applying external downward pressure on the security wrap directly above the dome 35.

Figure 12:
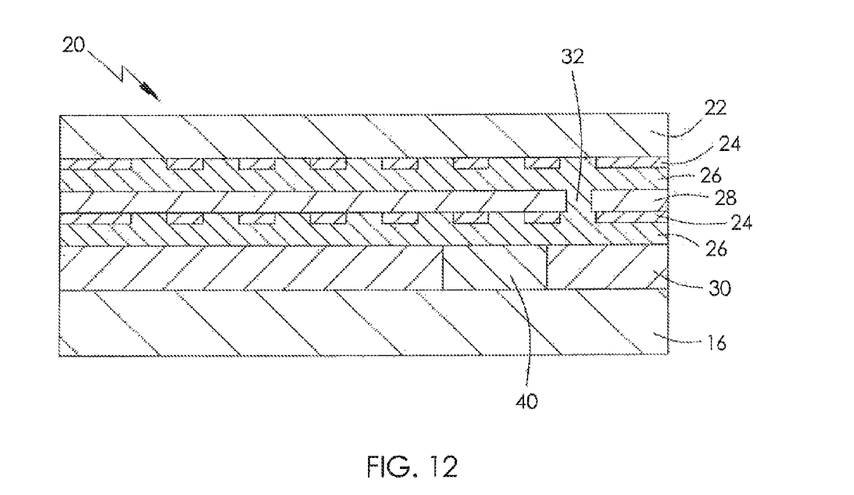
FIG. 12 is a sectional view of a two screen security wrap using a conductive material member as a connection element.

FIG. 12 is a sectional view showing main components in a double screen construction of a single surface security wrap 20 utilizing a conductive material 40 to connect security wrap 20 traces to the parent device 16 and where the surface of the parent device 16 is for example a rigid or flexible PCB. This material can include anisotropic or isotropic conductive adhesives, depending on connection design, in resin or film form. Connection is established by means of polymerization of the adhesive or pressure applied from a protrusion of a device enclosure. The conductive material 40 replaces the metal domes 34 and the extensions 36 of the conductive layer 26 and connect the screen terminals 48 to the alarm circuit. A similar arrangement can be made for the double screen, double circuit construction of the security wrap 20 of FIG. 10 by deletion of the vias 32 interconnecting the conductive layers and providing isolated through connections for the screen terminals 48.

Figure 13:
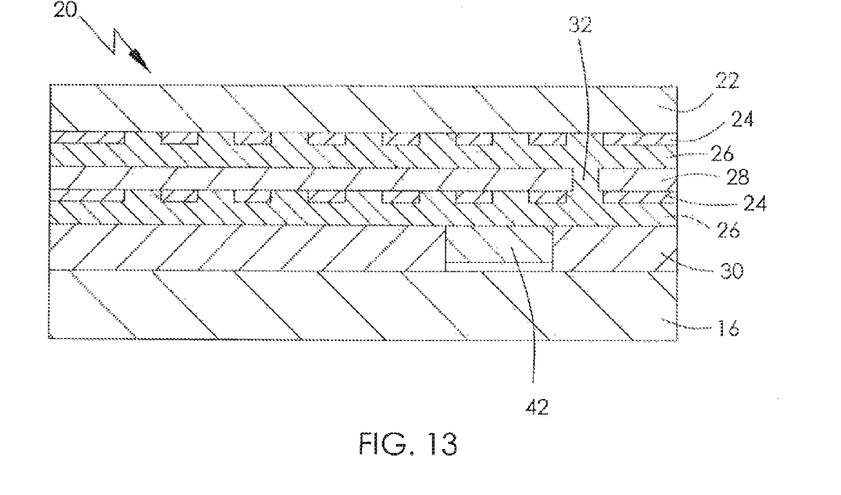
FIG. 13 is a sectional view of a two screen security wrap having a carbon pad as a connection element.

FIG. 13 is a sectional view showing main components in a double screen construction of a single surface security wrap 20 utilizing a printed carbon pad 42 to connect security wrap 20 traces to the parent device 16 and where the surface of the parent device 16 is for example a rigid or flexible PCB. The carbon pad 42 replaces the conductive material 40 used in the embodiment of FIG. 12. A similar arrangement can be made for the double screen, double circuit construction of the security wrap 20 of FIG. 10 by deletion of the vias 32 interconnecting the conductive layers 26 and providing isolated through connections for the screen terminals 48.

The carbon pads 42 preferably do not fill the void formed in the adhesive layer 30 such that, in the relaxed state, there is no direct electrical connection between the screen terminals 48 and the alarm terminals. However, by applying a force to the security wrap 20 directly above the carbon pads 42 to resiliently deform the security wrap the carbon pads come into contact with the parent device 16 and electrically connect the screen terminals 48 to the alarm terminals. Typically the carbon pad 42 connection is established by means of pressure applied from a protrusion of a device enclosure. In this way, an alarm condition is triggered by mere opening of the device enclosure before any direct attempt to remove the security wrap 20 is made.

Figure 14:
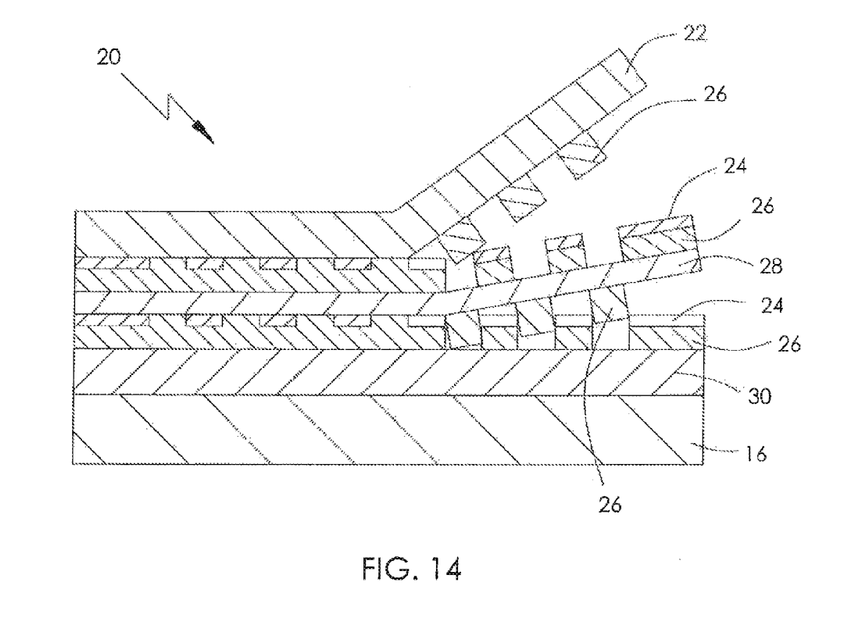
FIG. 14 is a simplified sectional view of the security wrap of FIG. 10 showing separation of a conductive trace.

FIG. 14 is a simplified sectional view showing separation of conductive layers in a double conductive layer construction: As shown, in the corner of the security Wrap 20 where the substrate 22 has been lifted, the conductive traces 46 of the screens 26 have been torn into pieces damaging the conductive traces 46 and alerting the resistance between the screen terminals 48. In the example shown the conductive traces 46 have been completely severed in several places. Portions of the conductive trace of the first screen 26 applied directly to the substrate 22 remains bonded to the substrate 22 but portions of the conductive trace applied to the release layer 24 remain bonded to the dielectric layer 28. An additional separation occurs between the second screen 26 and the dielectric layer 28, due to the reduced adhesion provided by the second release layer 24 applied to the dielectric layer 28 creating areas of weakened adhesion between the dielectric layer 28 and the conductive trace of the second screen 26. Thus portions of the conductive trace of the second screen 26 applied directly to the dielectric layer 28 remains bonded to the dielectric layer 28 but portions of the conductive trace applied to the release layer 24 remain bonded to the adhesive layer 30 which also remains bonded to the parent layer 16, due to the reduced strength of the bond between the release layer 24 and the dielectric 28 and the lower bond strength between the adhesive layer 30 and the conductive trace compared with the bond strength between the conductive trace and the dielectric layer 28. Thus the conductive traces of both screens 26 are severed as the substrate 22 is prised from the parent device 16.

It should be noted that in the sectional views of FIGS. 9 to 14, the section is cut along a conductor of the security screen 26 for convenience. It will be understood that the areas of the screen 26 where there is no trace, will be filled with material of the overlaying layer, i.e. either dielectric material or adhesive material, both of which are electrically insulative.

Figure 15:
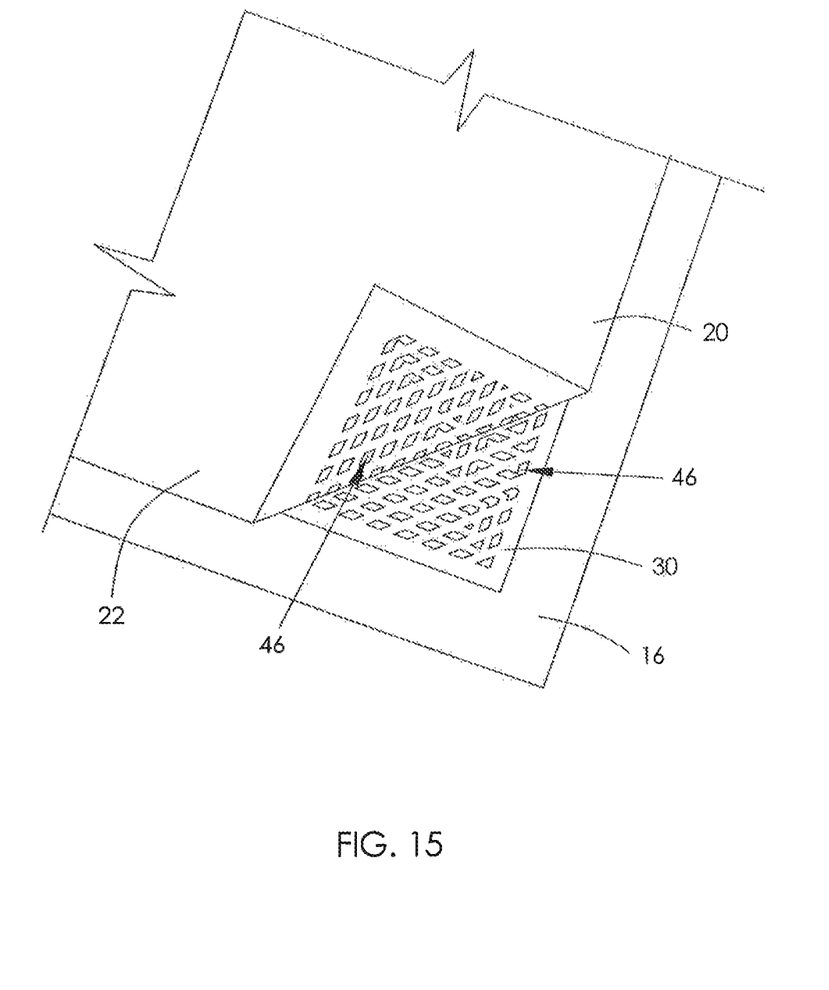
FIG. 15 is a schematic view of a partially separated security wrap.

FIG. 15 illustrates an attempt to remove a security wrap 20 having breakable conductors, as described above, after it has been fitted to the PCB 16. As the corner of the security wrap 20 is lifted from the PCB 16, the conductor 46 is torn apart, with part of the conductor remaining glued to the PCB 16 and part of the conductor remaining attached to the substrate 22 or dielectric 28. Actually, the pattern created by the conductor 46 on the substrate 22 and the PCB 16 conforms to the pattern of the release layer 24. The bond between the conductor 40 and the substrate 22 is stronger than the bond between the conductor 46 and the adhesive 30. However, the bond between the conductor 46 and the release ink is weaker than the bond between the conductor 46 and the adhesive 30. Hence the conductor 46 remains bonded to the adhesive layer 30 where the release ink pattern was applied and remains bonded to the substrate 22 where the adhesion modifier pattern was not applied. Thus after separation, the connection between the two screen terminals 48 is open circuited.

Figure 16:
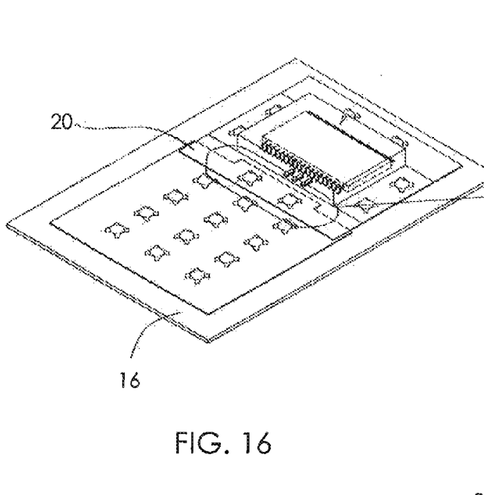
FIGS. 16 and 16A illustrate a resilient connection method between a security wrap and a parent device.
Figure 16A:
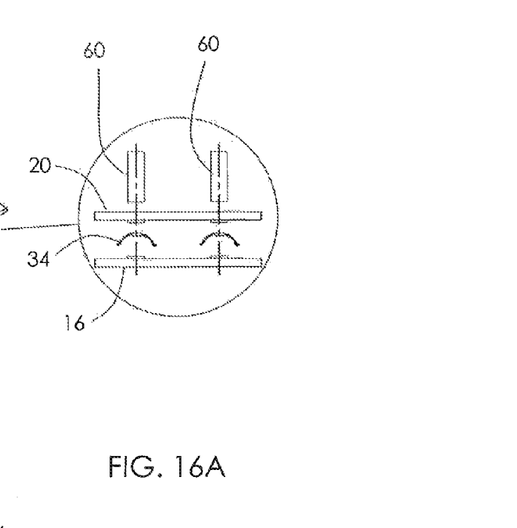

FIGS. 16 and 16A, illustrate an additional security measure briefly described herein before. At least one of the screen terminals 48 is connected to an alarm terminal by a resilient or spring loaded connection which is biased to the open condition. FIG. 16 shows a parent device 16 in the form of a PCB having a security wrap 20 fitted there to. FIG. 16A is a enlarged, exploded view of two connections between the security wrap 20 and the PCB 16. Metal domes 34 are used for the connection between the security wrap 20 and the PCB 16 but in their relaxed state they resiliently lift off the PCB terminal pads. Spigots 60 formed on a part of the housing for the PCB 16 are arranged to bear down on the security wrap 20 so as to press the screen terminals 48 against the domes 34 and the domes 34 against the PCB terminals to establish an electrical connection, as the housing is closed. When the housing is opened, the spigots 60 separate from the security wrap and the domes 34 relax and the connection is broken, raising an alarm condition. The domes 34 are one example of a resilient connector and the carbon pads of FIG. 13 are another.

Figure 17:
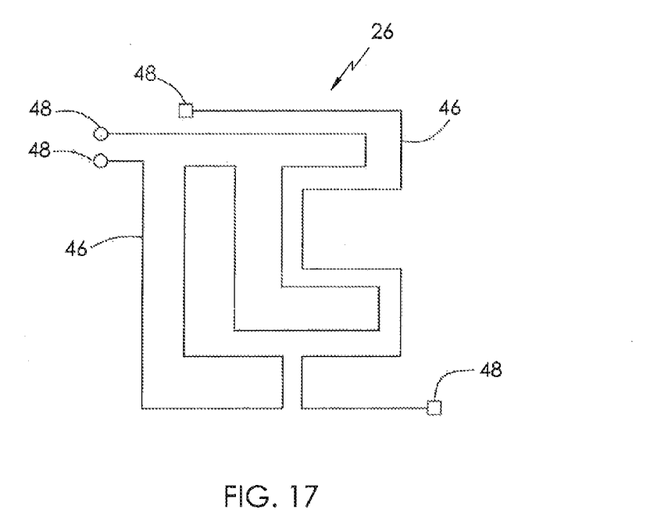
FIG. 17 is a schematic illustration of a screen having two conductive traces.

FIG. 17 illustrates a screen 26 having two conductive traces or conductors 46, each having two ends forming a pair of screen terminals 48. Depending on the complexity of the alarm circuit, a screen may have any number of conductors 46.

While, the drawings have been enlarged for better clarity of observation and description, in the preferred embodiments, the width of the conductive traces and the spaces there between are in the range of 1 to 1,000 microns. The preferred embodiment uses a trace width between 200 and 300 microns. This produces a good compromise between costs and security level as the finer the widths the higher the security level but the more expensive is the printing process.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A tamper indication device for protecting an electronic component having a bonding surface, comprising:
 a substrate having a first side and a second side opposite to each other;
 a first security screen disposed over the first side of said substrate and including a first pair of screen terminals and a first conductive track between the first pair of screen terminals;
 a second security screen including a second pair of screen terminals and a second conductive track between the second pair of screen terminals and overlaying the first conductive track on said first security screen; and
 a layer of adhesive over a side of said second security screen remote from said substrate and bonding said second security screen to the bonding surface of the electronic component, wherein
 the first conductive track includes a plurality of portions that are closely spaced from each other,
 the second conductive track includes a plurality of portions that are closely spaced from each other, and
 spaces between adjacent ones of the plurality of potions of the first conductive track of the first security screen overlap at least a part of the plurality of portions of the second conductive track of the second security screen.

2. The tamper indication device of claim 1, wherein said second security screen is disposed over the second side of said substrate.

3. The tamper indication device claim 1, further comprising a dielectric layer over a side of said first security screen remote from said substrate, wherein said second security screen is disposed over said dielectric layer.

4. The tamper indication device of claim 1, further comprising an adhesion modification layer having an intermittent pattern formed between the first side of said substrate and said first security screen, wherein said first security screen has a bonding strength to said substrate in the intermittent pattern of said adhesion modification layer different than a bonding strength between said first security screen and said substrate outside the intermittent pattern of said adhesion modification layer.

5. The tamper indication device of claim 1, wherein:
 the electronic component includes an alarm circuit having a plurality of terminals; and
 the first pair of screen terminals on said first security screen is coupled to two of the plurality of terminals of the alarm circuit of the electronic component.

6. The tamper indication device of claim 5, wherein the second pair of screen terminals of said second security screen is coupled to another two of the plurality of terminals of the alarm circuit of the electronic component.

7. The tamper indication device of claim 5, wherein second conductive track between the second pair of screen terminals of said second security screen is connected in series with the first conductive track between the first pair of screen terminals of said first security screen between the two of the plurality of terminals of the alarm circuit of the electronic component.

8. The tamper indication device of claim 7, further comprising a conductive via connecting a terminal in the first pair of screen terminals on said first security screen to a terminal in the second pair of screen terminals on said second security screen.

9. The tamper indication device of claim 5, wherein:
the alarm circuit of the electronic component is sensitive to a variation in a resistance between the two of the plurality of terminals; and
the second conductive track between the second pair of screen terminals of said second security screen is connected in parallel with the first conductive track between the first pair of screen terminals of said first security screen between the two of the plurality of terminals of the alarm circuit of the electronic component.

10. The tamper indication device of claim 5, wherein:
the electronic component further includes a conductive pad formed on the bonding surface and coupled to one of the two terminals of the plurality of terminals; and
said layer of adhesive includes a conductive plug formed therein and connecting one of the second pair of screen terminals on said second security screen to the conductive pad on the bonding surface of the electronic component.

11. The tamper indication device of claim 5, wherein:
the electronic component further includes a conductive dome formed on the bonding surface and coupled to one of the two terminals of the plurality of terminals;
said second security screen further includes a conductive extension connected to one of the second pair of the screen terminal and over the conductive dome in the bonding surface of the electronic component;
said layer of adhesive has a void surrounding the conductive dome on the bonding surface of the electronic component and the conductive extension on said second security screen; and
the conductive extension of said second security screen is configured to contact the conductive dome on the bonding surface of the electronic component in response to a force applied on the said substrate over the conductive extension.

12. The tamper indication device of claim 1, wherein said first security screen further includes an additional pair of screen terminals and an additional conductive track between the additional pair of screen terminals.

13. The tamper indication device of claim 1, wherein the first conductive track on said first security screen is formed from a conductive ink in a printing process.

14. The tamper indication device of claim 1, wherein:
the first conductive track on said first security screen has a first pattern: and the second conductive track on said second security screen has a second pattern different from the first pattern.

15. A tamper indication device for protecting a device having an alarm circuit by bonding to the device, comprising:
a substrate having a first side and a second side opposite to each other;
a first security screen disposed over the first side of said substrate and including a first conductive track coupled to the alarm circuit of the device;
a second security screen including a second conductive track overlaying the first conductive track on said first security screen and coupled to the alarm circuit of the device; and
a layer of adhesive over the a side of said second security screen remote from said substrate and bonding the said second security screen to the device, wherein
the first conductive track includes a plurality of portions that are closely spaced from each other,
the second conductive track includes a plurality of portions that are closely spaced from each other, and
spaces between adjacent ones of the plurality of potions of the first conductive track of the first security screen overlap at least a part of the plurality of portions of the second conductive track of the second security screen.

16. The tamper indication device of claim 15, wherein said second security screen is disposed over the second side of said substrate.

17. The tamper indication device of claim 15, further comprising a dielectric layer over a side of said first security screen remote from said substrate, wherein said second security screen is disposed over said dielectric layer.

18. The tamper indication device of claim 15, wherein:
the first conductive track on said first security screen has a first pattern: and
the second conductive track on said second security screen has a second pattern different from the first pattern.

19. The tamper indication device of claim 15, wherein the first conductive track on said first security screen and the second conductive track on said second security screen are connected in series between two terminals of the alarm circuit of the device.

20. The tamper indication device of claim 15, wherein said first security screen further includes an additional conductive track between the additional pair of screen terminals coupled to the alarm circuit of the device.

* * * * *